United States Patent [19]
Mori

[11] Patent Number: 5,966,219
[45] Date of Patent: Oct. 12, 1999

[54] IMAGE READING SYSTEM AND INFORMATION RECORDING MEDIUM AND METHODS FOR OPERATING SAME

[75] Inventor: Hiromi Mori, Nagoya, Japan

[73] Assignee: Brother Kogyo Kabushiki Kaisha, Nagoya, Japan

[21] Appl. No.: 08/934,729

[22] Filed: Sep. 22, 1997

[30] Foreign Application Priority Data

Oct. 15, 1996 [JP] Japan .................................... 8-272638

[51] Int. Cl.$^6$ ................................................. H04N 1/047
[52] U.S. Cl. ......................... 358/442; 358/474; 358/488; 250/559.4
[58] Field of Search .................................... 358/442, 474, 358/486, 488, 468, 434, 438, 448, 449, 471, 498, 505; 382/309, 312, 317, 319; 399/16, 377; 250/559.06, 234, 235, 236, 559.4; 395/113

[56] References Cited

U.S. PATENT DOCUMENTS

| | | |
|---|---|---|
| 5,107,279 | 4/1992 | Yamamoto et al. ......................... 399/1 |
| 5,485,247 | 1/1996 | Morishita et al. ......................... 399/16 |
| 5,513,017 | 4/1996 | Knodt et al. .............................. 358/471 |
| 5,563,685 | 10/1996 | Onthank ................................. 399/377 |
| 5,631,920 | 5/1997 | Hardin .................................... 375/200 |
| 5,706,457 | 1/1998 | Dwyer et al. ............................ 358/444 |
| 5,760,412 | 6/1998 | Yang et al. ........................... 250/559.4 |

*Primary Examiner*—Edward L. Coles
*Assistant Examiner*—Joseph R. Pokrzywa
*Attorney, Agent, or Firm*—Oliff & Berridge, PLC

[57] ABSTRACT

Even after a scanner is instructed to read an original and it is later detected by an original detecting sensor that there is no original, if the original is loaded correctly, a normal reading operation is performed even without re-instruction to read the original. Thus, the operability on the user side is improved.

14 Claims, 5 Drawing Sheets

IMAGE READING SYSTEM AND INFORMATION RECORDING MEDIUM AND METHODS FOR OPERATING SAME

BACKGROUND OF THE INVENTION

1. Field of Invention

The present invention relates to an image input/output system comprising an image reading device such as a scanner and host equipment such as a personal computer, as well as an information recording medium which stores programs capable of being executed by a computer of the host equipment.

2. Description of Related Art

For inputting images to host equipment (typical of which is a personal computer) or for reading images for facsimile transmission, there is known a scanner that reads an original such as a photograph or a document and that then outputs image data.

The scanner is connected to host equipment. In accordance with a scanner driver program installed in the host equipment, a read start signal is transmitted to the scanner from the host equipment to read image data, which data are then displayed on the screen of the host equipment.

However, if the original to be read is not loaded or if the original is not conveyed due to some trouble of a conveyance system, it is impossible to read the original. To avoid this inconvenience, the conventional scanner is provided with a sensor for detecting whether the original is present or not. If there is no original, the sensor advises the user of the absence of original.

In the conventional image reading system, however, after the absence of original has been recognized in accordance with a signal provided from the sensor, the reading operation is stopped until transmission of a new read start signal.

Therefore, after the original has once been loaded, the user is again required to perform a setting operation of the transmission of a read start signal on the host equipment. Such an operation is required even when the original can be loaded at once. Thus, the conventional system has been inconvenient.

SUMMARY OF THE INVENTION

It is an object of the present invention to provide an image reading system capable of performing a normal reading operation without performing a repeated setting operation if an original is loaded correctly, even in the case where the absence of original has been recognized by means of a sensor, as well as an information recording medium which stores a program permitting the host equipment to execute such operation.

In order to achieve the above-mentioned object, an image reading system described in a first aspect comprises peripheral equipment provided with an image reading and host equipment performs two-way communication between it and the peripheral equipment. The peripheral equipment is also provided with a detector that detects whether there is an original read by the image reading device, and is further provided with a controller that causes the image reading device to be driven in accordance with a control signal outputted from the host equipment. The controller outputs an original absence signal to the host device when it is judged by the detector that the original is not present. The host equipment is provided with a controller that outputs a control signal to the image reading device of the peripheral equipment and, when the original absence signal has been inputted after output of the control signal, again outputs the control signal after the lapse of a predetermined time.

According to the image reading system set forth in the first aspect, when a control signal for the image reading device is outputted from the host equipment and is received by the controller of the peripheral equipment, the controller causes the image reading device to be driven in accordance with the control signal. In this case, if the detector judges that there is no original present, the controller of the peripheral device outputs an original absence signal to the host equipment. Upon input of this original absence signal to the controller of the host equipment, the controller again outputs the aforesaid control signal after the lapse of a predetermined time. Therefore, if the user loads the original correctly within the predetermined time, the control signal is again outputted even without repeating the operation on the host equipment side, and the image reading device is driven to read the original.

An image reading system described in a second aspect, in combination with the image reading system described in the first aspect, is characterized in that the host equipment is provided with a time changing device for changing the above predetermined time.

According to the image reading system described in the second aspect, the above predetermined time is changed by the time changing device so that the time interval until re-output of the control signal is of a value desired by the user.

An image reading system described in a third aspect, in combination with the image reading system described in the first or the second aspect, is characterized in that the host equipment is provided with a limit time changing device that limits the time for the re-output and changes the limit time.

According to the image reading system set forth in the third aspect, the time for re-output of the control signal is limited, so in the case where it is difficult to effect the normal loading of the original, the re-output operation is stopped and the host equipment is released. Further, the aforesaid limit time is changed by the limit time changing device so that the limit time relating to re-output of the control signal takes a value desired by the user.

An image reading system described in a fourth aspect, in combination with the image reading system described in the first or the second aspect, is characterized in that the host equipment is provided with a count changing device that changes the number of times of the re-output.

According to the image reading system set forth in the fourth aspect, the number of times of the control signal re-output is limited, so when it is difficult to perform the normal loading of the original, the re-output operation is stopped and the host equipment is released. Further, the number of times of the control signal re-output is changed into a value desired by the user.

An information recording medium described in a fifth aspect, in order to achieve the foregoing object, stores a program capable of being executed by a computer of a host equipment which performs two-way communication between it and peripheral equipment, the peripheral equipment being provided with an image reading device, a detector that detects whether there is any original read by the image reading device, and a controller that causes the image reading device to be driven and outputs an original absence signal when the detector judges that the original is not present. The program stored in the information recording medium is for making the computer of the host equipment output a control signal to the controller of the peripheral equipment so as to drive the image reading device. The program also causes the host equipment, upon input of the original absence signal from the peripheral equipment after output of the said control signal, to re-output the control signal after the lapse of a predetermined time.

The information recording medium set forth in the fifth aspect is allowed to be ready by the computer of the host equipment which performs two-way communication between it and the peripheral equipment which is provided with the image reading device detector and controller. By so doing, the host equipment is allowed to output a control signal to the image reading device in accordance with operation performed by the user. When this control signal is received by the controller of the peripheral equipment, the controller drives the image reading device in accordance with the control signal. But if it is judged by the detector that there is no original, the controller outputs an original absence signal to the host equipment. On the other hand, in the case where this original absence signal is inputted to the controller of the host equipment, allowing the controller to recognize the absence of original, the control signal is re-outputted after the lapse of a predetermined time by the controller. Therefore, if the user loads the original correctly within the predetermined time, the control signal is outputted again even without repeating the operation on the host device side, and the original reading is driven to read the original.

According to the image reading system set forth in the first aspect, an original absence signal is outputted when the detector in the peripheral equipment judges that there is no original, while on the host equipment side a control signal is re-outputted after the lapse of a predetermined time. Therefore, if the user loads the original correctly within this predetermined time, the control signal is outputted again even without repeating the operation on the host device side. Thus, the image reading system is convenient for use.

According to the image reading system set forth in the second aspect, since the host device is provided with a time changing device that changes the predetermined time, the time interval until re-output of the control signal can be set at a value desired by the user.

According to the image reading system set forth in the third aspect, the host equipment is provided with a limit time changing device that limits the time for the re-output and changes the limit time, so when it is difficult to effect the normal loading of the original, the re-output operation can be stopped to release the host equipment. Further, the limit time for re-output of the control signal can be set at a value desired by the user.

According to the image reading system set forth in the fourth aspect, in combination with the image reading system set forth in the first or the second aspect, since the host equipment is provided with a count changing device that changes the number of times of the control signal re-output, the number of times of the re-output is limited, and when it is difficult to effect the normal loading of the original, the re-output operation can be stopped to release the host equipment. Besides, the number of times of the control signal re-output can be set at a value desired by the user.

The information recording medium set forth in the fifth aspect is allowed to be read by the computer of the host equipment which performs two-way communication between it and the peripheral equipment, the peripheral device being provided with an image reading device, an original detector that detects whether there is an original read by the image reading device, and a controller that causes the image reading device to be driven and outputs an original absence signal when it is judged by the detector that there is no original. By so doing, upon output of the original absence signal in response to the judgment of the detector in the peripheral equipment that there is no original, the control signal for the image reading device is re-outputted from the host equipment after the lapse of a predetermined time. Therefore, if the user loads the original correctly within the predetermined time, the control signal is outputted again even without repeating the operation on the host equipment side, whereby an image reading system convenient for use is implemented.

BRIEF DESCRIPTION OF THE DRAWINGS

Preferred embodiments of the present invention will be described in detail with reference to the accompanying drawings wherein.

DETAILED DESCRIPTION OF PREFERRED EMBODIMENTS

The present invention will be described in detail by way of embodiments thereof hereinafter with reference to the accompanying drawings.

(First Embodiment)

Figure 1:
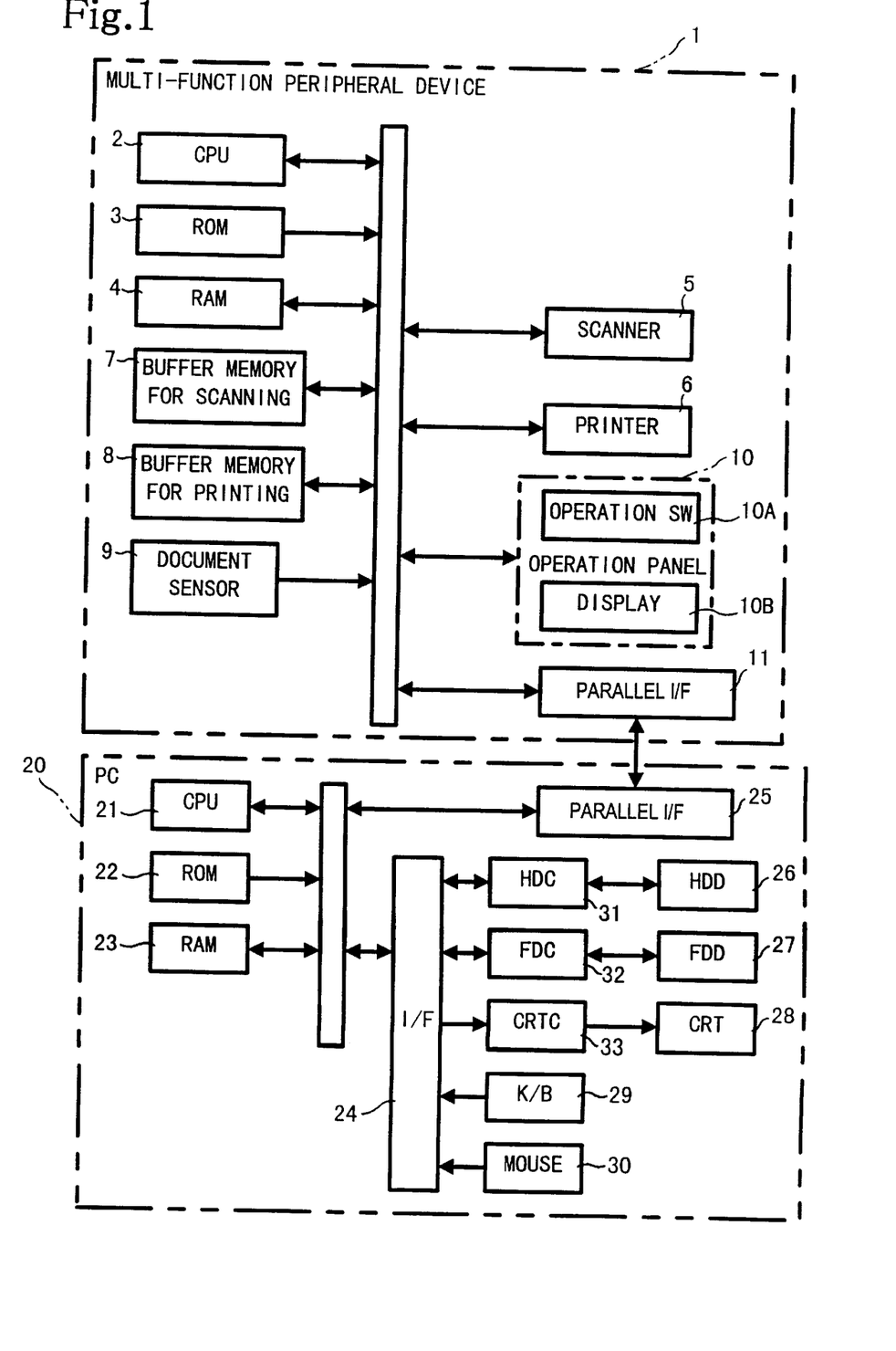
FIG. 1 is a block diagram showing a functional configuration of hardware in an image input/output system according to a first embodiment of the present invention.

A first embodiment of the present invention will now be described with reference to FIGS. 1 to 5. FIG. 1 is a block diagram of an image reading system according to the first embodiment of the present invention. In this embodiment, multi-function peripheral equipment 1 having both a scanner and a printer is used as the peripheral equipment provided with image reading means, and a PC (personal computer) 20 is used as the host equipment which performs two-way communication between it and the multi-function peripheral equipment 1.

In FIG. 1, the multi-function peripheral equipment 1 comprises a CPU 2 as control means, a ROM 3 which stores control programs, a RAM 4 for storing various data to be used in printing such as for color conversion in printing and also various data to be used in image reading such as for determining a resolution in image reading with a scanner, a scanner 5 for reading an original as image data, a printer 6 for performing an ink jet color printing, a buffer memory 7 for temporarily storing the image data of the original read by the scanner 5, a printing buffer memory 8 for storing data to be used in printing by the printer 6, an original detecting sensor 9 for detecting whether there is an original to be read by the scanner 5, an operation panel 10 having an operating section 10A and a display section 10B, a two-way parallel I/F (interface) 11 including an I/O port for performing communication with PC 20.

The scanner 5 used in this embodiment is what is called a sheet feed type. It comprises, though not shown, a read head for reading an original, a conveyance mechanism for conveying the original, and a motor for driving the conveyance mechanism. As the printer 6 in this embodiment there is used an ink jet type color printer. The printer comprises, though not shown, a printing head, a carriage for moving the printing head, a conveyance mechanism for the conveyance of printing paper, and motors for driving the carriage and the conveyance mechanism.

The original detecting sensor 9 is constituted by an optical sensor such as, for example, a photodiode disposed at a predetermined position of an original conveyance path in the scanner 5.

Now, the construction of the PC (personal computer) 20 as host equipment will be described with reference to the functional block diagram of FIG. 1. The PC 20 comprises a CPU 21, a ROM 22 with control programs stored therein, a RAM 23 for storing various data, an input/output I/F (interface) 24 which comprises I/O ports, and a two-way parallel I/F 25 which includes an I/O port for communication with the multi-function peripheral equipment 1.

The input/output I/F 24 is connected to a hard disk drive (HDD) 26, a floppy disk drive (FDD) 27, a CRT 28, a keyboard (K/B) 29, and a mouse 30. The HDD 26, FDD 27, and CRT 28 are connected to the input/output I/F 24 through a hard disk drive controller (HDC) 31, a floppy disk drive controller (FDC) 32, and a CRT controller (CRTC) 33, respectively.

The parallel I/F 11 and parallel I/F 25, both for communication between the PC 20 and the multi-function peripheral equipment 1, are capable of effecting two-way communication. In accordance with instructions given from the PC 20 the scanner 5 can read an image and the printer 6 can output the image. Further, errors generated in the scanner 5 and the printer 6 can be transmitted to the PC 20 side.

Figure 2:
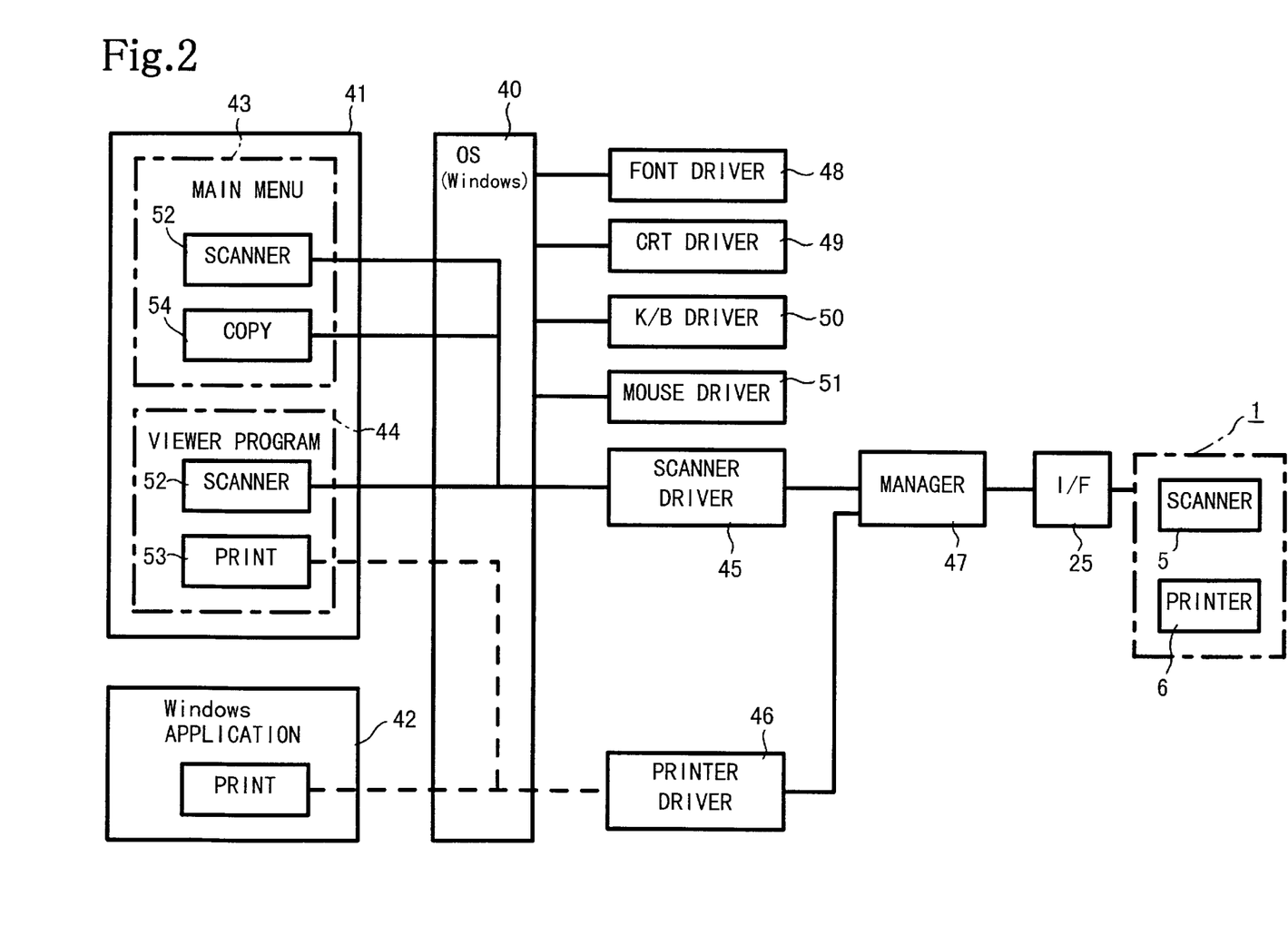
FIG. 2 is a block diagram showing a functional configuration of software in the image input/output system.

Next, with reference to FIG. 2, the following description is now provided about a functional configuration viewed from software of the system of this embodiment having the above-described hardware configuration. The system of this embodiment uses Windows (a registered trademark of Microsoft Corporation) as an operating system (OS). As shown in FIG. 2, on an OS 40 there are operated both an application program 41 which comprises a main menu program 43 for selecting a function menu of the multi-function peripheral equipment 1 and a viewer program 44 for the display of image data on screen, and a general application program 42, such as word processor software.

Figure 3:
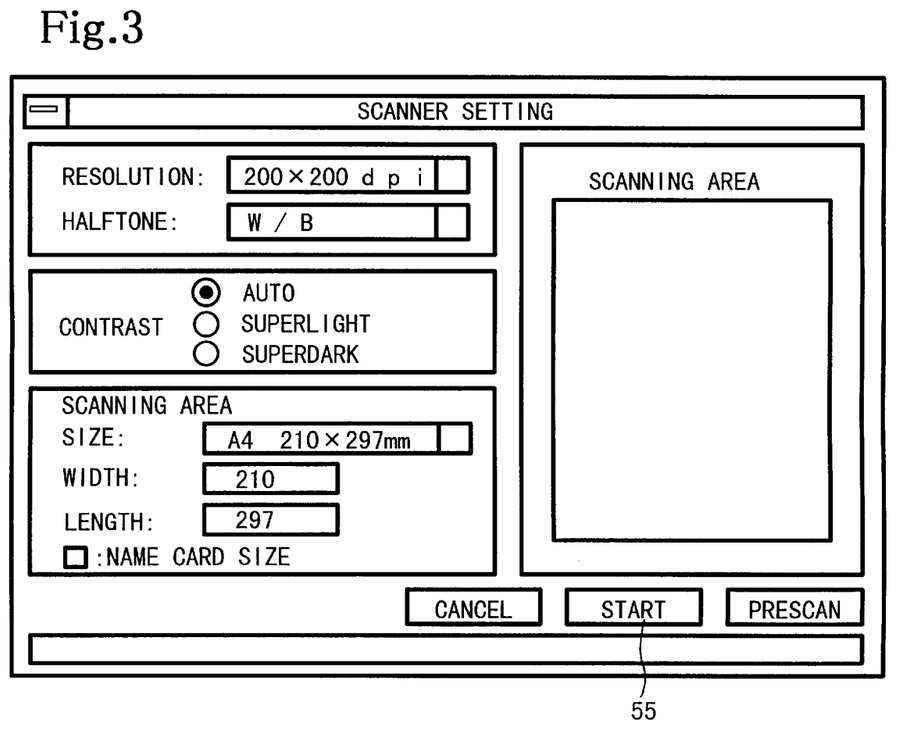
FIG. 3 is a schematic diagram showing an example of display upon start-up of a scanner driver program used in the image input/output system.

In a started state of the application program 41 annexed to the multi-function peripheral equipment 1, if [SCAN] button (not shown), which is indicated upon selection of the main menu program 43 and the viewer program 44, is selected, such a dialog box as shown in FIG. 3 is displayed on the screen, thus permitting the user to perform a setting operation. Items for setting include resolution, half tone, contrast, and scan size. [START] button 55 for the start of scan is also displayed.

It is a scanner driver program 45 that functions to display the above setting items on the screen and also functions to cause a scan operation to be executed in accordance with such set data and start instruction.

The scanner driver program 45 receives image data from the multi-function peripheral equipment 1 through I/F 25 and a manager program 47 during the execution of scan and sends the image data to the viewer program 44, which in turn displays the image data on the screen.

When [PRESCAN] is selected, the scanner driver program 45 also functions to temporarily display on the screen the contents of image data received from the multi-function peripheral equipment 1 through I/F 25 and manager program 47. More specifically, the image data is displayed in a scanning area of the dialog box shown in FIG. 3.

Further, the scanner driver program 45 causes error information to be also displayed on the screen. The error information, which indicates that no original is loaded to the scanner 5, is transmitted from the multi-function peripheral equipment 1 and inputted to the scanner driver program 45 through I/F 25 and manager program 47.

On the display of the main menu 43 in the application program 41 there is provided a [COPY] button 54 for executing a copying function of printing scanned data directly without display on the screen. Further, on the display of the viewer program 44 in the application program 41 is provided a [PRINT] button 53 for executing a printing function of printing image data after display for confirmation or after subjecting the data to image processing for example.

Like the instruction for starting the scanning operation on the main menu 43, an instruction for starting the copying function is sent from the main menu 43 to the scanner driver program 45. Alternatively, a dedicated copy driver program may be provided separately from the scanner driver program 45. An instruction for starting the printing function is sent from the viewer program 44 to a printer driver program 46. Further, the printer driver program 46 receives error information on the printer 6 which is transmitted from the multi-function peripheral equipment 1, and causes the error information to be displayed on the screen.

Also when the general application program 42, such as word processor software, is started, the printer driver program 46 is started by selecting a command such as a printing command on the application program 42, and a dialog box (not shown) for printing similar to the dialog box shown in FIG. 3 is displayed on the screen. Now, it is possible to set resolution and paper size, make color adjustment, and instruct the start of printing. Thus, also in the application program 42, by selecting the printer driver program 46 corresponding to the multi-function peripheral equipment 1 on the selection display of the printer driver, there is performed a printing operation through the printer driver program 46.

Generally, the method for accessing the image scanner or printer from PC 20 differs depending on the hardware configuration of the image scanner, printer, or PC 20. However, it is difficult to change the accessing method from the application programs 41 and 42 for each of such different hardware configurations. In this embodiment, in view of the point just mentioned, the scanner driver program 45 and the printer driver program 46 are interposed between the application programs 41,42 and the multi-function peripheral equipment 1. In this way there is obtained a unified accessing method from the application programs 41 and 42, while different accessing methods for different hardware configurations are made available by both driver programs 45 and 46, whereby it becomes possible to make access between the application programs 41,42 and plural types of multi-function peripheral equipment.

Likewise, a font driver program 48 for font control, a CRT driver program 49 for CRT control, a keyboard driver program 50 for keyboard control, and a mouse driver program 51 for mouse control, are operated on the OS 40.

Further, the multi-function peripheral equipment 1 used in this embodiment is provided with both scanner 5 and printer 6 and is connected to the PC 20 through a single cable, so the manager program 47 is provided for the management of two-way communication between the driver programs 45, 46 and a communication program on the multi-function peripheral equipment 1 side. The manager program 47 is accessed from both scanner driver program 45 and printer driver program 46. The manager program 47 transmits data outputted from each of the two programs 45, 46 to the multi-function peripheral equipment 1 as packet data which identifies the source as one are of the driver programs 45, 46. The manager program 47 further possesses a function of discriminating the type of the packet data received from the multi-function peripheral equipment 1 and distributing the received data to either the scanner driver program 45 or the printer driver program 46. Thus, the substantial control based on the contents of the transmitted and received packet data is executed by the scanner driver program 45, printer driver program 46, or the multi-function peripheral equipment 1.

In the data received by the manager program 47 from the multi-function peripheral equipment 1 there are included not only the data read by the scanner 5 but also error information indicating the absence of original in the scanner 5, or error information on the printer 6, or information relating to the state of reception preparation of the multi-function peripheral equipment 1. In accordance with any of these pieces of information the manager program 47 stops the transmission of data from the PC 20 to the multi-function peripheral equipment 1 and advises the user of the information on the screen, whereby the normal scanning or printing operation can be performed.

According to the prior art, when error information indicating the absence of original is transmitted from the scanner 5, the scanning operation is stopped and a message to the effect that there is no original is displayed on the screen of the PC 20, then the user is required to perform a setting operation for instructing the execution of a new scanning operation.

However, the multi-function peripheral equipment 1 and the PC 20 are usually disposed in proximity to each other, so once the original absence message is displayed despite the user can correctly load the original at once, the user is again required to operate the PC 20 to start scanning, or else it is impossible to effect the scanning operation.

According to this embodiment, in view of the above point, the scanner driver program 45 is designed so that re-trial is performed automatically after the lapse of a predetermined time even when the PC 20 receives error information indicating the absence of original from the multi-function peripheral equipment 1 side.

Figure 4:
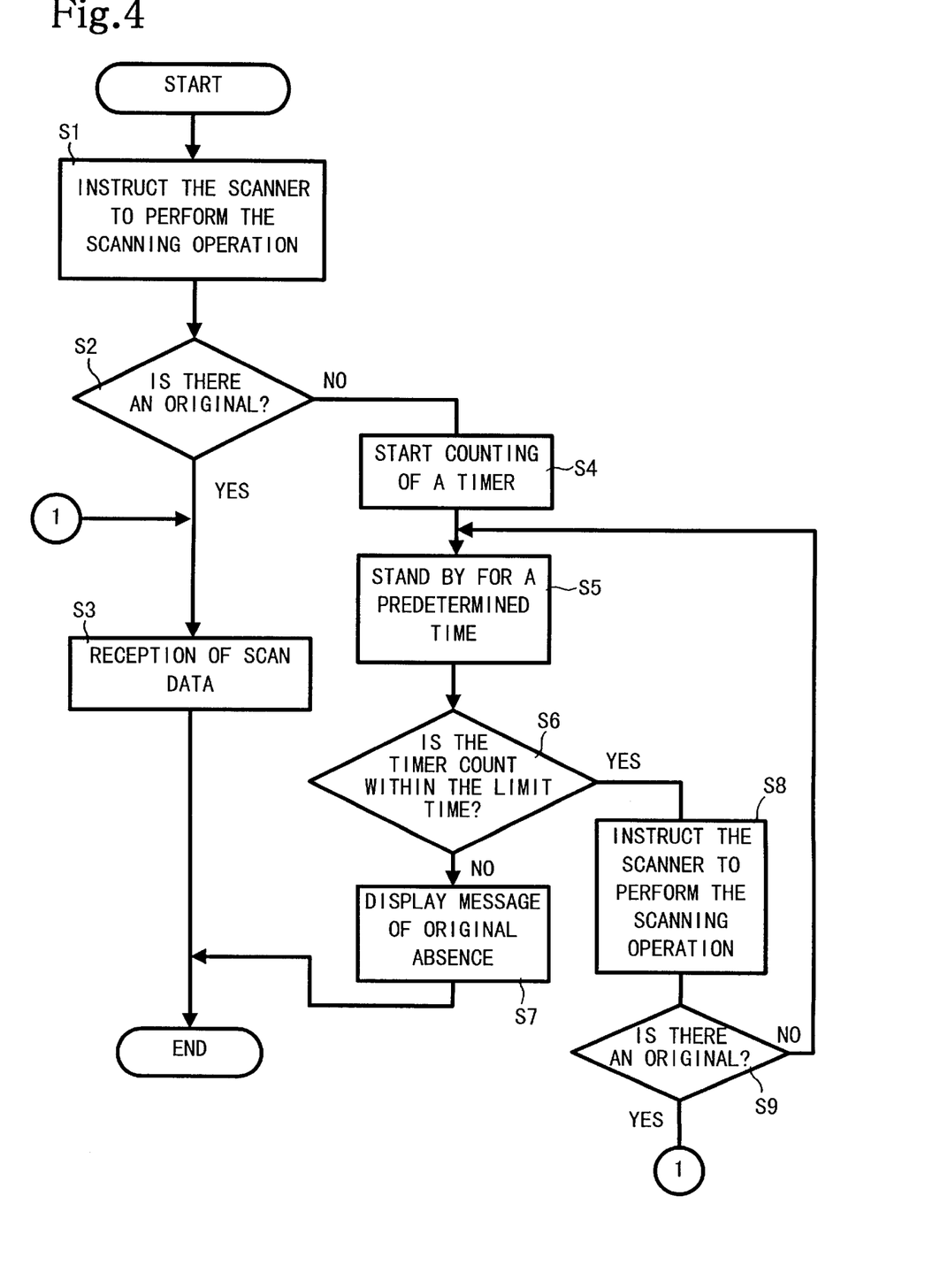
FIG. 4 is a flowchart showing an outline of operations performed in accordance with the scanner driver program.

The operation of the system of this embodiment, including the reading operation carried out by the scanner driver program 45, will be described below in accordance with the flowcharts of FIGS. 4 and 5.

First, in the application program 41 it is judged, in a started state of the main menu 43 or the viewer program 44, whether SCANNER button 52, PRINT button 53, or COPY button 54 has been clicked or not. When SCANNER button 52 has been clicked, the scanner driver program 45 is started from the main menu 43 or the viewer program 44 for instructing the multi-function peripheral equipment 1 to start the scanning operation. As a result, such a dialog box as shown in FIG. 3 is displayed on the screen of the PC 20, and the scanning operation is started by clicking START button 55 shown in FIG. 3. The flowchart of FIG. 4 shows operations subsequent to the clicking operation for the START button 55.

The scanner driver program 45 makes sure that there is a sufficient space area in the RAM 23, then sets a start command using a control code or the like, and outputs the start command to the manager program 47. The manager program 47 then transmits this command as packet data to the multi-function peripheral equipment 1 to make it possible to distinguish that this command is data relating to the scanner driver, and instructs the scanner 5 to execute the scanning operation (S1).

Figure 5:
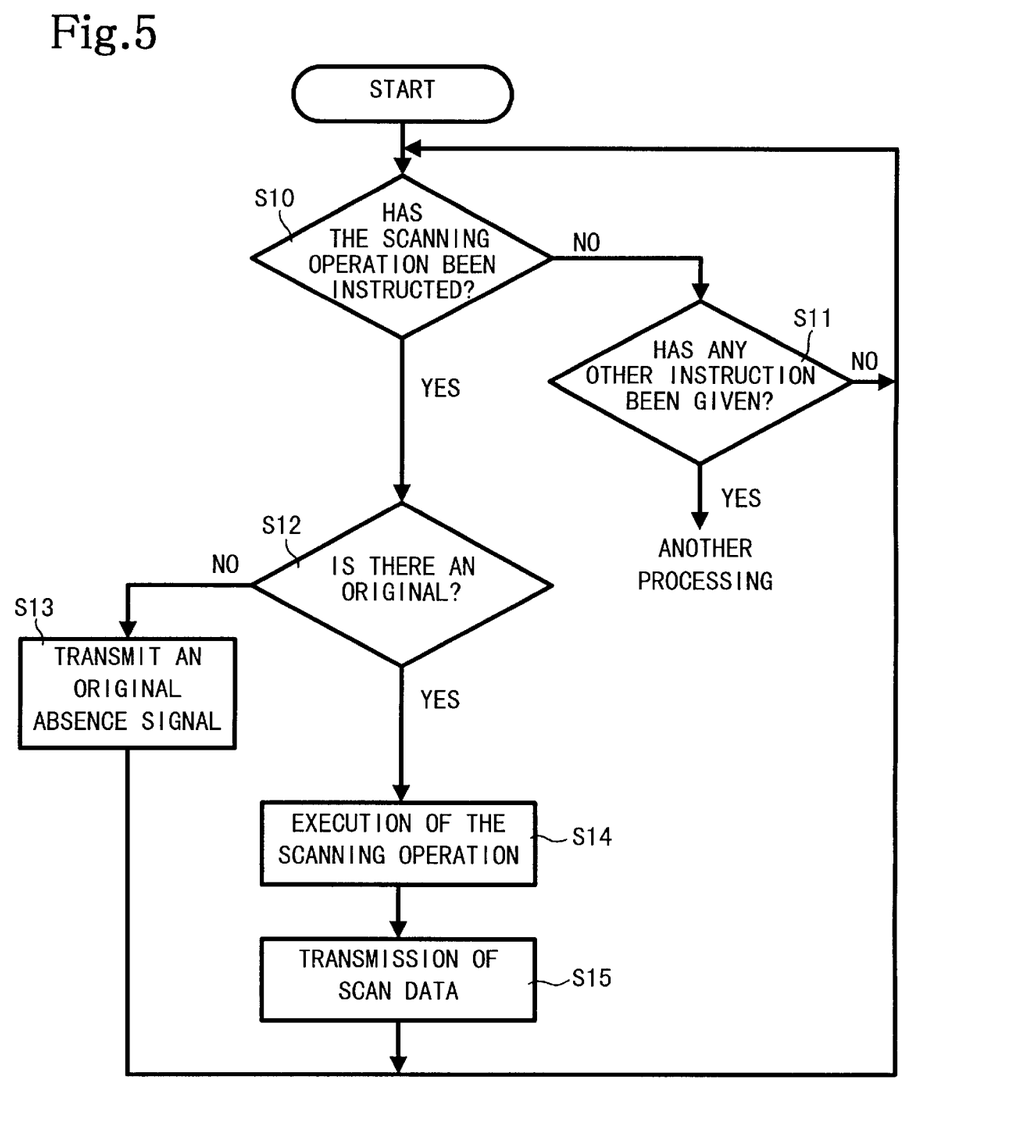
FIG. 5 is a flowchart showing an outline of operations of a scanner used on multi-function peripheral equipment side in the image input/output system.

On the other hand, as shown in FIG. 5, the multi-function peripheral equipment 1 side is waiting for a command transmitted from the PC 20 side (S10–S11). When the start command has been transmitted from the scanner driver program 45 through the manager program 47 as mentioned above (S10,YES), the original detecting sensor 9 detects whether there is any original read by the scanner 5. As a result, if no original is detected (S12, NO), an original absence signal is transmitted to the PC 20 side (S13).

After transmission of the start command (S1), the scanner driver program 45 side waits for the reception of data transmitted from the multi-function peripheral equipment 1. Upon receipt of the original absence signal it is recognized that there is no original (S2,NO). Then, counting of a timer is started (S4). The counting is performed by the CPU 21 which counts its internal clocks. Thereafter, after stand-by for a predetermined time having nothing to do with the timer (S5), if the count of the timer is within a limit time (S6,YES), the start command is re-transmitted (S8) to instruct scan again.

The predetermined time for stand-by in step S5 is preset to the extent that the user can load the original, say, 10 seconds. The limit time in step S6 is for limiting the time for performing re-transmission of the start command after detection of the absence of original as mentioned above, to a predetermined time. This limit time is also set beforehand to an appropriate value (say 1 minute).

Through such a processing, if no original is loaded in the scanner 5 and if the count of the timer is within the limit time (S6,YES), the start command is transmitted from the scanner driver program 45 (S8) and the original absence signal is transmitted from the multi-function peripheral equipment 1 side (S13), as described above. These operations are repeated until lapse of the limit time.

However, if the user loads the original correctly before the lapse of the limit time (S9,YES), it is judged that there is an original (S12,YES) in an original presence/absence judging process (S12) shown in FIG. 5, and the scanning operation is carried out (S14). More specifically, the original is read in the scanner 5 and the read data is once stored in the scanner reading buffer memory 7. Then, after image data corresponding to one sheet of the original has been read, the data stored in the scanner reading buffer memory 7 is transmitted from the multi-function peripheral equipment 1 to the PC 20 (S15).

While the reading of the original is performed, the original absence signal is not transmitted from the multi-function peripheral equipment 1 to the scanner driver program 45 (S2,YES), so the scanner driver program comes to assume a waiting state for the reception of scan data. Upon receipt of scan data from the multi-function peripheral equipment 1 in the manner mentioned above, the scan data is stored in the RAM 23 and is displayed in the scanning area of the dialog box shown in FIG. 3 (S3).

However, in the event the count of the timer has exceeded the foregoing limit time without loading of the original during re-transmission of the start command as described above (S6,NO), the original absence message is displayed on the screen of PC 20 (S7) and the scanning process is terminated.

According to this embodiment, as set forth above, even in the event the user forgets to load the original or even in the event the original is not conveyed correctly, the user is not required to re-operate the PC 20 for performing the scanning operation, if the limit time has not yet elapsed. Thus, the image reading system of this embodiment is easy to use.

(Second Embodiment)

The second embodiment of the present invention will be described below. As to the portions common to the first embodiment, explanations thereof will be omitted.

According to the second embodiment, the foregoing predetermined time (S5 in FIG. 4) can be changed by CPU 21. To be more specific, another window for changing time is displayed on the dialog box shown in FIG. 3, thereby allowing the user to make an input through the mouse or the keyboard, and the value thus inputted is stored in a predetermined area of RAM 23 or in HDD 26. If a predetermined time as a reference time (10 seconds in the first embodiment) is stored in the scanner driver program 45 or in HDD 26 as another file, the initial value can be resumed easily even after the predetermined time has been changed using the window for changing the predetermined time. Such a configuration can afford an image reading system conforming to the user's desire.

(Third Embodiment)

The third embodiment of the present invention will be described below. As to the portions common to the first embodiment, explanations thereof will be omitted.

According to the third embodiment, the foregoing limit time of the timer count (S6 in FIG. 4) can be changed. To be more specific, a further window for changing the limit time is displayed on the dialog box shown in FIG. 3, thereby allowing the user to make an input through the mouse or the keyboard, and the value thus inputted is stored in a predetermined area of RAM 23 or in HDD 26. Further, if a predetermined limit time as a reference value (1 minute in the first embodiment) is stored in the scanner driver program 45 or in HDD 26 as another file, the initial value can be resumed easily even after the limit time has been changed using the window for changing the limit time. Such a configuration can afford an image reading system conforming to the user's desire.

(Fourth Embodiment)

The fourth embodiment of the present invention will be described below. As to the portions common to the first embodiment, explanations thereof will be omitted.

Although in the first embodiment the start command re-transmitting operation is limited by the limit time (S6 in FIG. 4), the re-transmitting operation in this fourth embodiment is limited by the number of times. The number of times can be made changeable by CPU 21 which serves as count changing means. To be more specific, yet another window for changing the number of times is displayed on the dialog box shown in FIG. 3, thereby allowing the user to make an input through the mouse or the keyboard, and the value thus inputted is stored in a predetermined area of RAM 23 or in HDD 26. Further, if a predetermined number of times as a reference value is stored in the scanner driver program 45 or in HDD 26 as another file, the initial value can be resumed after the change. Such a configuration can afford an image reading system conforming to the user's desire.

Although the image reading systems of the above embodiments each employ a scanner included in the multifunction peripheral equipment, the present invention is not limited thereto, but is applicable also to the case where a discrete scanner is used.

Further, although the foregoing re-transmitting operation is carried out in accordance with the scanner driver program 45, this scanner driver program is stored in an information recording medium such as floppy disk or CD-ROM, which is installed, for example, in a personal computer as host equipment.

What is claimed is:

1. An image reading system comprising peripheral equipment having image reading means and host equipment that communicates with said peripheral equipment, said peripheral equipment further comprising original detecting means for detecting whether an original read by said image reading means is present and control means for causing said image reading means to be driven in accordance with a control signal outputted from said host equipment, and for outputting an original absence signal to said host computer when it is judged by said original detecting means that the original is not present, and said host equipment having control means for outputting a control signal directing scanning to said image reading means in said peripheral equipment, and upon input of said original absence signal after output of said control signal, for re-outputting said control signal again after the lapse of a predetermined time, wherein said host equipment has one of a limit time for re-outputting said control signal and a limit on a number of times for re-outputting said control signal.

2. An image reading system according to claim 1, wherein said host equipment includes time changing means for changing said predetermined time.

3. An image reading system according to claim 1, said host equipment further including changing means for changing the limit time.

4. An image reading system according to claim 1, said host equipment further including count changing means for changing the number of times said control signal is re-outputted.

5. An image reading system comprising peripheral equipment having an image reader and host equipment that communicates with said peripheral equipment, said peripheral equipment further comprising an original detector that detects whether an original read by said image reader is present and a controller that causes said image reader to be driven in accordance with a control signal outputted from said host equipment, and that outputs an original absence signal to said host equipment when it is judged by said original detector that the original is not present, and said host equipment having a controller that outputs a control signal to commence scanning to said image reader in said peripheral equipment, wherein upon input of said original absence signal after output of said control signal, the controller re-outputs said control signal again after a predetermined time has lapsed, wherein said host equipment has one of a limit time for re-outputting said control signal and a limit on a number of times said host equipment re-outputs said control signal.

6. An image reading system according to claim 5, wherein said host equipment includes a time changing device that changes said predetermined time.

7. An image reading system according to claim 5, said host equipment further including a changing device that changes the limit time.

8. An image reading system according to claim 5, said host equipment further including a count changing device that changes the number of times said control signal is re-outputted.

9. An information recording medium storing a program capable of being executed by a computer of host equipment that communicates with peripheral equipment, said peripheral equipment having an image reader, an original detector that detects whether an original read by said image reader is present, and a controller that causes said image reader to be driven and outputs an original absence signal when it is judged by said original detector that the original is not present, said program comprising:

a first program that causes a computer to output a control signal to commence scanning to said controller and said peripheral equipment so as to drive said image reader;

a second program that causes the computer, upon input of said original absence signal from said peripheral equipment after output of said control signal, to re-output said control signal after a predetermined time lapses; and at least one subprogram comprising one of a subroutine for implementing a limit time for re-outputting said control signal and a subroutine for placing a limit on a number of times for re-outputting said control signal.

10. A method of operating an image reading system including peripheral equipment having an image reader and host equipment that communicates with said peripheral equipment, the method comprising the steps of:

detecting whether an original read by said image reader is present;

causing said image reader to be driven in accordance with a control signal to commence scanning outputted from said host equipment;

outputting an original absence signal to said host equipment when it is judged that the original is not present; and outputting the control signal to commence scanning to said image reader and said peripheral equipment, and upon input of said original absence signal after output of said control signal, re-outputting said control signal again after a predetermined time has lapsed, wherein a limit is placed on re-outputting said control signal, the limit being provided by one of a limit time for re-outputting said control signal and a limit on a number of times for re-outputting said control signal.

11. A method according to claim 10, further comprising changing said predetermined time.

12. A method according to claim 10, wherein method further includes changing the limit time.

13. A method according to claim 10, further comprising:

changing the number of times said control signal is re-outputted.

14. A method for operating an information recording medium that stores a program capable of being executed by a computer of host equipment that communicates with peripheral equipment, said peripheral equipment having an image reader, an original detector that detects whether an original read by said image reader is present; and a controller that causes said image reader to be driven and that outputs an original absence signal when it is judged by said original detector that the original is not present, said method comprising:

using said program, causing said computer to output a control signal to commence scanning to said controller in said peripheral equipment so as to drive said image reader;

causing said computer to re-output said control signal after a predetermined time lapses upon input of said original absence signal from said peripheral equipment after output of said control signal; and limiting re-output of said control signal by one of implementing a limit time for re-outputting said control signal and limiting a number of times for re-outputting said control signal.

* * * * *